March 24, 1964 E. W. ONULAK ETAL 3,125,850
CHAIN
Filed March 22, 1961
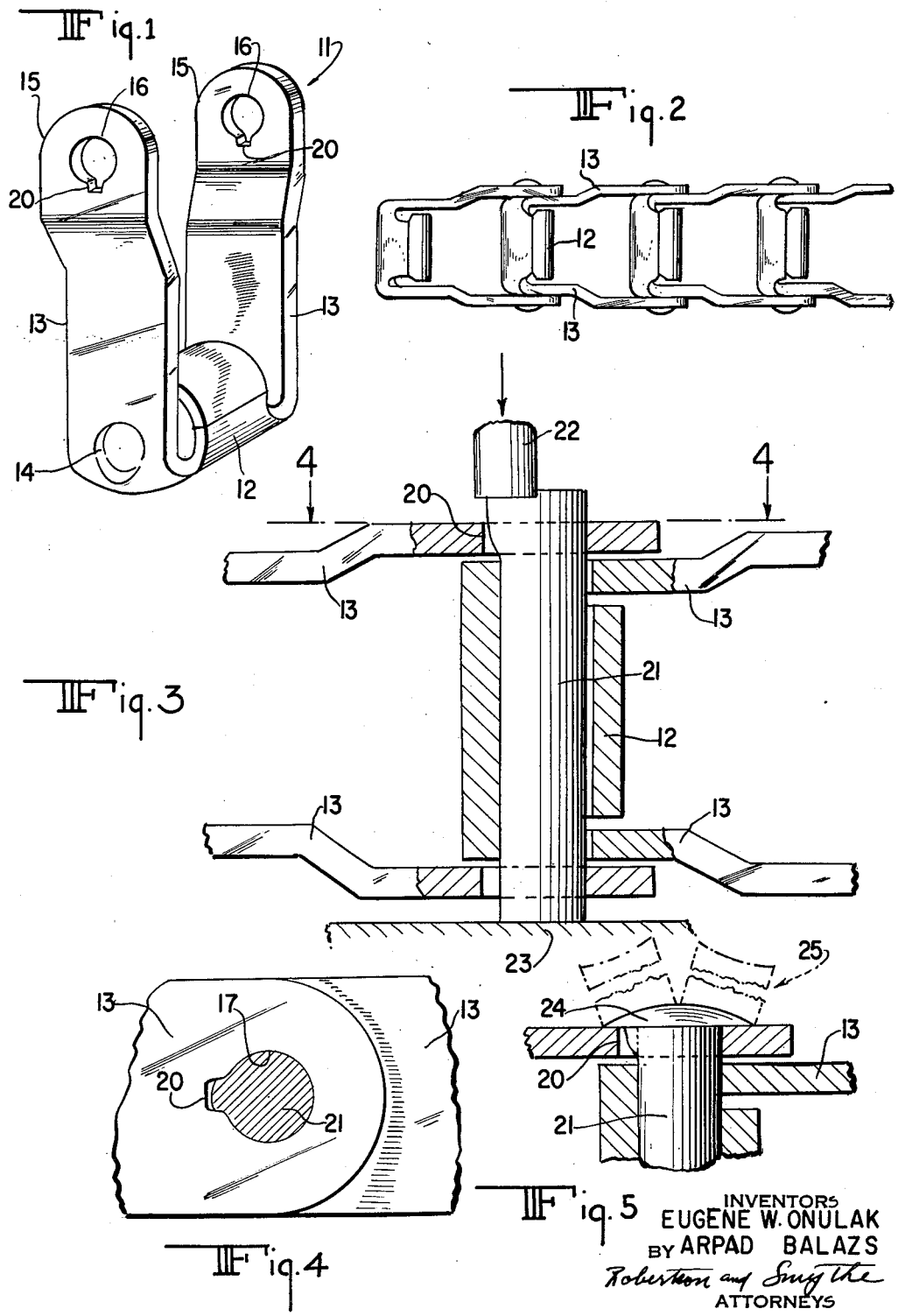
INVENTORS
EUGENE W. ONULAK
BY ARPAD BALAZS
Robertson and Smythe
ATTORNEYS

3,125,850
CHAIN

Eugene W. Onulak and Arpad Balazs, Huntington, Ind., assignors to The Locke Steel Chain Company, Huntington, Ind., a corporation of Connecticut
Filed Mar. 22, 1961, Ser. No. 97,600
2 Claims. (Cl. 59—8)

This invention relates to a chain and the method for making the same.

One of the problems in prior chain links, such as the type shown in Patent No. 2,793,536, is to hold the pin from rotation relative to the links. When the hinge pin ends are deformed during assembly, the metal is work-hardened with the result that further operations such as staking are performed with difficulty. Also tool life becomes short and insufficient metal may be displaced due to the difficulty of plastically deforming hardened metal.

One of the objects of the invention is to provide a link chain having increased strength and wherein the pin is staked in such a manner as to have improved finished physical and appearance characteristics.

Another object of the invention is to provide for increased life of the tools employed in connecting the chain links together.

A further object of the invention is to form the connection for the links by a method of metal working steps wherein said steps may be performed with increased facility.

In one aspect, the invention relates to a manner of connecting U-shaped chain links in which the connecting or hinge pins are plastically deformed, as by staking the ends of the pins to plastically deform the metal to substantially fill non-circular apertures in legs of the chain links. The filling of pin metal in these apertures will result in locking the pins and legs in non-rotational relationship with each other. The deformed or staked ends of the pins are then subjected to a hot-heading, spinning or other deforming operation to provide pin heads of larger size than the leg apertures.

Other objects, advantages and features of the invention will become apparent from the following description and drawings, which are merely exemplary.

In the drawings:

FIG. 1 is a perspective view of a chain link forming a part of the invention;

FIG. 2 is a plan view of a portion of the completed link chain;

FIG. 3 is a plan view, partially broken away, of a hinge pin being deformed by a staking tool to connect a pair of chain links;

FIG. 4 is a partial vertical sectional view taken along the lines 4—4 of FIG. 3 in the direction of the arrows; and FIG. 5 is a partial plan view, partially broken away, of the deformed hinge pin being subjected to a spinning operation.

Referring to FIG. 1, the U-shaped chain link generally shown at 11 comprises a central cylindrically shaped tubular bearing portion 12 and a pair of leg portions 13 extending from and substantially perpendicular to the tubular portion. This may be of the type shown in said Patent No. 2,793,536. Each leg has a circular opening 14 in alignment with the cylindrically shaped tubular bearing 12. The legs are substantially parallel to each other and each preferably has a slightly outwardly offset portion 15 at their ends, such that the offset leg portions are adapted to receive the central portion of an adjacent identical link. Each offset leg portion preferably is provided with a non-circular aperture 16 which may be in the form of a circular opening having a slot 20 in its arcuately shaped side wall.

When connecting a plurality of the links 11 to form a chain, a portion of which is shown in FIG. 2, the non-circular leg apertures of the links are aligned with the bearing portion and openings 14 of an adjacent link to receive a connecting or hinge pin 21.

As shown in FIG. 3, a portion of the end of the pin 21 is plastically deformed, or otherwise deformed, such as by staking with a staking tool 22, to move some of the deformed metal into slot 20 to substantially fill the same and thereby prevent relative rotation between the pin and apertured leg. Preferably, a flat backing surface 23 is provided to abut the opposite end of the pin. This deformation step may be performed as part of a production line assembly or otherwise. Also, both ends of the pin may be deformed simultaneously, or individually, or only one end may need to be deformed in instances when pins having a head at one end are used. When the deforming is part of production line assembly, the link may be clamped to locate the pin.

The deformed or staked end of the hinge pin 21, shown in FIG. 3, is subsequently subjected to a hot-heading, spinning or other plastically deforming operation wherein a finished head 24 (FIG. 5) is provided for the pin by a spinning tool 25 or the like. The head, of course, will be of relatively larger dimensions than the non-circular leg aperture 16, such that when both ends of the pin have an appropriate head axial withdrawal of the pin will be prevented.

It should be noted that displacing metal at one end of the pin into the corresponding slot will be sufficient to prevent relative rotation of the pin with respect to the corresponding legs of the link, yet permit relative rotation between the bearing portion of the adjacent link and the hinge pin therewithin.

By performing the staking or deformation of the pin end prior to the spinning or other operation that would tend to harden the metal being worked, the staking or deforming can be accomplished with increased facility than if the metal working steps were reversed. This sequence will also tend to increase the life of the staking or deforming tool since the tool is not applied to a work-hardened pin.

It is to be understood that the foregoing description is merely intended for the purpose of illustration, and that the principles of the invention are not intended to be limited thereto, except as defined in the appended claims.

What is claimed is:

1. The method of forming a chain from a plurality of chain links each having a cylindrically shaped bearing and a pair of substantially parallel legs extending therefrom, said legs having a non-circular aperture adjacent their ends, comprising the steps of inserting a cylindrical hinge pin in each aligned bearing and corresponding leg apertures of adjacent links, substantially filling the non-circular contour of the corresponding leg apertures with a portion of their hinge pin by deforming a portion of an extreme end of said hinge pins, thereby preventing relative rotation between the corresponding pins and apertured legs, and finally plastically deforming the deformed end of each hinge pin to provide head means on the pins of larger size than the corresponding apertures.

2. The method of forming a chain from a plurality of chain links each having a cylindrically shaped bearing and a pair of substantially parallel legs extending therefrom, said legs having a non-circular aperture adjacent their ends, comprising the steps of inserting a cylindrical hinge pin in each aligned bearing and corresponding leg apertures of adjacent links, substantially filling the non-circular contour of the corresponding leg apertures with a portion of their hinge pin by staking a portion of the end of said hinge pins, thereby preventing relative rotation between the corresponding pins and apertured legs, and finally heat forming the staked end of said hinge pins to provide head means on the pins of larger size than the corresponding apertures.

References Cited in the file of this patent

UNITED STATES PATENTS

| | | |
|---|---|---|
| 439,043 | Stirckler | Oct. 21, 1890 |
| 978,717 | Egge | Dec. 13, 1910 |
| 1,873,619 | Monjonnier | Aug. 23, 1932 |
| 1,884,443 | Wertman | Oct. 25, 1932 |
| 1,899,976 | Muller | Mar. 7, 1933 |
| 2,793,536 | Onulak | May 28, 1957 |